United States Patent [19]
Maier et al.

[11] Patent Number: 6,082,521
[45] Date of Patent: Jul. 4, 2000

[54] APPARATUS AND METHOD FOR TRANSPOSING SORTED GOODS INTO AN ORDERED SEQUENCE

[75] Inventors: Wilhelm Maier, Wettingen; Jean-Claude Oppliger, Niederhasli, both of Switzerland

[73] Assignee: Grapha-Holding AG, Hergiswil, Switzerland

[21] Appl. No.: 08/990,369

[22] Filed: Dec. 15, 1997

[30] Foreign Application Priority Data

Dec. 19, 1996 [CH] Switzerland .............................. 3117/96

[51] Int. Cl.[7] .............................. B65G 47/10; B07C 5/00
[52] U.S. Cl. ........................ 198/349.6; 198/357; 198/358; 198/369.5; 209/584; 209/900
[58] Field of Search .................... 198/357, 358, 198/369.5, 349.6; 209/584, 900

[56] References Cited

U.S. PATENT DOCUMENTS

| 5,287,976 | 2/1994 | Mayer et al. ........................... 209/584 |
| 5,363,971 | 11/1994 | Weeks et al. ........................... 209/584 |
| 5,421,464 | 6/1995 | Gillmann et al. ....................... 209/584 |

FOREIGN PATENT DOCUMENTS

| 072310 | 2/1983 | European Pat. Off. .......... B07C 3/02 |
| 613730 | 9/1994 | European Pat. Off. .......... B07C 3/02 |
| 697260 | 2/1996 | European Pat. Off. .......... B07C 3/00 |
| 27 41 802 | 4/1979 | Germany ........................... B07C 3/04 |
| 1623798 | 1/1991 | U.S.S.R. ................................ 209/584 |

OTHER PUBLICATIONS

European Search Report for CH 311796.
Derwent Abstracts for EP 72310 and DE 27 41 802.

Primary Examiner—Christopher P. Ellis
Assistant Examiner—Mark A. Deuble
Attorney, Agent, or Firm—Darby & Darby

[57] ABSTRACT

For processing sorted goods, in particular for processing mail pieces in postal facilities, an apparatus is proposed for transposing address-bearing sorted goods into an ordered sequence according to a predetermined order of possible addresses, starting with two supplied partial sequences in which the sorted goods are already ordered according to the predetermined order of possible addresses. The apparatus includes a number of actuable transfer devices equal to the number of partial sequences for sequentially transferring the sorted goods of a respective one of the partial sequences to a selection unit. The selection unit is actuable for selectively receiving sorted goods from all transfer devices and for conveying the received sorted goods to a delivery point common to all sorted goods. For this purpose, the selection unit is actuated by a controller for recording the addresses of the sorted goods to be transferred.

18 Claims, 2 Drawing Sheets

APPARATUS AND METHOD FOR TRANSPOSING SORTED GOODS INTO AN ORDERED SEQUENCE

BACKGROUND OF THE INVENTION

The present invention relates to an apparatus for transposing address-bearing sorted goods into an ordered sequence according to a predetermined order of possible addresses, starting with at least two partial sequences in which the sorted goods are ordered according to the predetermined order, a method using the apparatus, as well as the use of an apparatus of this type for sorting of mail pieces having addresses in form of mailing addresses.

Before mail pieces are delivered by a mail carrier, these mail pieces are usually sorted at the post offices responsible for a postal district including the individual delivery areas of the postal district, where the mail pieces are then delivered by the mail carrier responsible for this delivery area.

In order to speed up delivery, the respective mail carrier generally sorts the mail pieces to be delivered in his delivery area, based on the mailing addresses and his carrier route. For this purpose, the individual mail pieces are sorted in accordance with the order of the delivery addresses along the carrier route.

This process is rather time-consuming and expensive and has to be completed before the mail pieces are actually delivered. Consequently, several postal authorities have started to provide special rates for large customers, such as mailers of newspapers, magazines, catalogues and the like, if they presort the mail pieces in advance according to the route of the respective mail carrier in order to facilitate and accelerate processing of mail before the mail delivered by the mail carrier.

However, the mail still has to be sorted by the mail carrier if two or more stacks of mail pieces which are already presorted, have to be processed for sorting.

With the foregoing disadvantages of the state of the art in mind, it is the object of the present invention to provide an apparatus for accelerating processing of several already presorted partial sequences of sorted goods which are supplied, for example, in the form of stacks, in particular mail pieces, and to describe a method using such apparatus.

SUMMARY OF THE INVENTION

The object is solved by an apparatus of the type described above which has a number of actuable transfer devices corresponding to the number of partial sequences for sequentially transferring the sorted goods of a respective one of the partial sequences to a selection unit, wherein the selection unit is actuable for selectively accepting sorted goods from all transfer devices, and for conveying the received sorted goods to a delivery point common to all sorted goods, as well as a controller for recording the addresses of the sorted goods to be transferred and for actuating the selection unit for receiving and delivering the sorted goods of all partial sequences according to the predetermined order.

By receiving and delivering the sorted goods of all partial sequences with the selection unit, the apparatus of the invention provides at the delivery point a single sequence of sorted goods comprising the sorted goods from all supplied partial sequences. For controlling the selection unit, the controller of the apparatus of the invention records the addresses of the sorted goods to be transferred. As a result, the controller can be used to determine at any point in time during the operation of the apparatus of the invention which one of the sorted goods which still has to be transferred from the individual partial sequences for generating the ordered sequence according to the predetermined sequence at the delivery point, is to be transferred next by the respective transfer device, and to actuate the selection unit accordingly. It is therefore sufficient, taking into account that the sorted goods of the supplied partial sequences are already sorted according to the predetermined order and that the transfer devices are designed for sequentially transferring the presorted mail pieces, that in order to specify which piece has to be transferred next, in each partial sequence only the address of the sorted item which can be transferred next by the respective transfer device, is considered. In this way, the problem described above with reference to conventional devices can be solved by using an apparatus of simple design and controlled in a simple manner.

In order to selectively receive and deliver the sorted goods of the individual partial sequences, the selection unit is advantageously moveable between transfer positions wherein the selection unit is actuable for accepting sorted goods from a respective one of the transfer devices, and a delivery position at the common delivery point for delivering the received sorted goods. One of the transfer positions can here be identical to the delivery position if the sorted goods are received at one side of the selection unit and delivered on the other side of the unit.

The apparatus of the invention can be constructed in a very compact form if the selection unit can be rotated about a stationary axis for movement between the individual transfer positions and the delivery position. The transfer devices can then be arranged along a circle about this stationary axis.

For securely and reliably transferring the sorted goods from the transfer devices to the delivery point, the selection unit preferably includes an actuable conveyor unit for transporting the sorted goods from the transfer devices to the delivery point. For the same reason, at least one of the transfer devices preferably also comprises an actuable conveyor unit for sequentially transferring the sorted goods to the selection unit. Finally, the reliability of the sorting process which can be carried out with the apparatus of the invention, can be improved further if at the delivery point there is disposed an actuable conveyor unit for removing the conveyed sorted goods.

The individual conveyor units advantageously have two mutually parallel conveyor belts wherein the sorted goods are placed between the conveyor belts. In this way, the processing speed with the apparatus of the invention can be increased, without running the risk that the sorted goods are released from the conveyor units as a result of the increased speed and without impairing the feed operation.

The versatility of an apparatus provided with conveyor units in form of two mutually parallel conveyor belts can be increased even further if at least one of the conveyor belts of at least one of the conveyor units is moveable perpendicular to the conveying direction of the conveyor belt against a biasing force. The same conveyor unit is then able to securely transport sorted goods having different thickness.

In the apparatus of the invention for transposing into an ordered sequence sorted goods which have addresses in form of mailing addresses, the mailing pieces of the partial sequences which are usually conveyed in the form of stacks, preferably stand upright, i.e. their principal surfaces are oriented in vertical planes. According to the invention, for processing mail pieces conveyed in this manner, the principal surfaces of the conveyor belts used in the conveyor units are then preferably also arranged in substantially vertical planes.

If the partial sequences are conveyed in form of stacks of sorted goods ordered in accordance with the predetermined order, a feed unit is advantageously associated with at least one of the transfer devices for sequentially removing the sorted goods from the stack of sorted goods and conveying the sorted goods to the transfer device.

Advantageously, for recording the addresses of the sorted goods, a reading device is associated with at least one of the transfer devices for automatically reading the addresses of the sorted goods to be conveyed by the transfer devices.

Preferably, the reading device of the apparatus of the invention is disposed between the feed unit and the transfer device. With this arrangement, addresses can be read during the time the sorted goods are conveyed to the transfer device and transmitted to the controller.

Since the controller can also be operated in such a way that the order of the addresses which are read with a reading device associated with one of the transfer devices, can be compared with the predetermined order, the apparatus of the invention can also be used to check, before the ordered sequence is created, if the order of the sorted goods of the corresponding partial sequence is correct. It is particularly advantageous, when sorted goods are transposed into an ordered sequence using the apparatus of the invention, if the addresses in the selection unit which conveys the received sorted goods of all partial sequences, point in the same direction.

As mentioned before, the apparatus of the invention for carrying out a method for transposing address-bearing sorted goods into an ordered sequence according to a predetermined order of possible addresses can be operated in a way that the sorted goods are conveyed by a number of transfer devices equal to the number of partial sequences to an actuable selection unit capable of accepting the sorted goods from all partial sequences and conveying the received sorted goods to a common delivery point. The selection unit is controlled so that it can receive and convey the sorted goods of all partial sequences according to the predetermined order depending on the addresses of the sorted goods to be transferred.

When carrying out this method, the predetermined order in the ordered sequence which is to be formed, can be reliably maintained, if the selection unit is instructed to accepting an individual item of the sorted goods item only in the event that such item is actually available for transfer to the selection unit in each of the transfer devices which convey sorted goods.

The order of the sorted goods in the supplied partial sequences can be checked with the method of the invention by comparing the order of the addresses of the sorted goods which are to be transferred by one of the transfer devices, with the predetermined order, before the sorted goods are conveyed to the selection unit.

For processing sorted goods, in particular for processing mail pieces in postal facilities, an apparatus is proposed for transposing address-bearing sorted goods into an ordered sequence according to a predetermined order of possible addresses, starting with two supplied partial sequences in which the sorted goods are already ordered according to the predetermined order of possible addresses. The apparatus includes a number of actuable transfer devices equal to the number of partial sequences for sequentially transferring the sorted goods of a respective one of the partial sequences to a selection unit. The selection unit is actuable for selectively receiving sorted goods from all transfer devices and for conveying the received sorted goods to a delivery point common to all sorted goods. For this purpose, the selection unit is actuated by a controller for recording the addresses of the sorted goods to be transferred.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1:
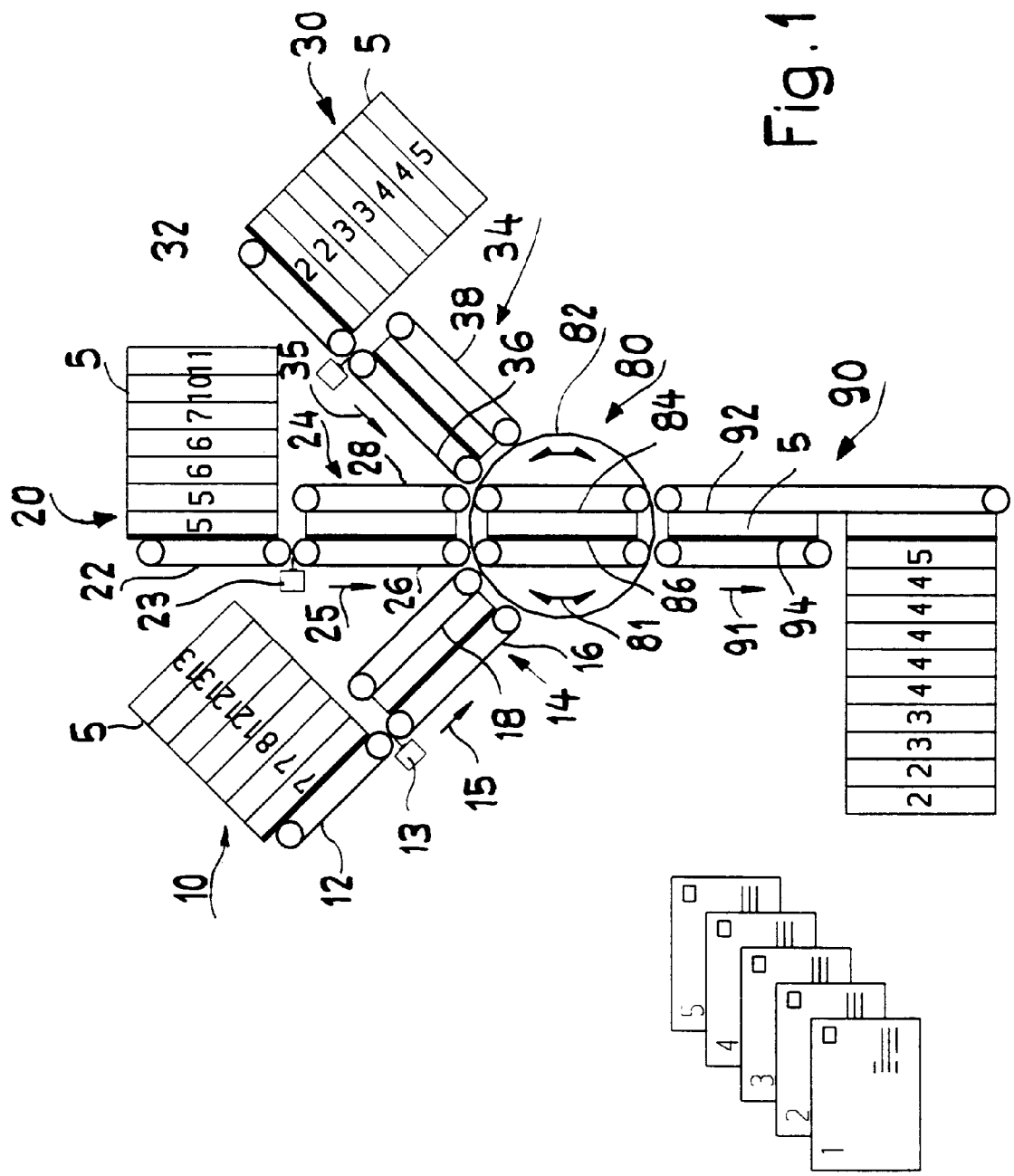
FIG. 1 is a top plan view of an apparatus in accordance with a first embodiment of the invention.

The apparatus shown in FIG. 1 is designed for transposing three partial sequences conveyed in form of stacks 10, 20, 30 of mail pieces, with the mail pieces 5 arranged according to a predetermined order of possible addresses, into an ordered sequence according to the predetermined order. For this purpose, for each of the conveyed stacks 10, 20, 30 of mail pieces there is provided a feed unit 12, 22 and 32, respectively, in form of a continuous loop conveyor belt for sequentially removing the mail pieces of the respective mail piece stack from the mail piece stack and for conveying these mail pieces to a transfer device 14, 24 and 34, respectively. Since the principal surfaces of the mail pieces 5 of the individual mail piece stacks are arranged in vertical planes, the principal surfaces of the conveyor belts 12, 22 and 32, respectively, forming the transfer devices are also oriented along vertical planes.

Between the feed units 12, 22 and 32 and the corresponding transfer devices 14, 24 and 34, respectively, there are disposed reading devices 13, 23 and 33, respectively, for reading mailing addresses printed on the individual mail pieces, for example, in form of bar codes and for transmitting the scanned mailing addresses to a controller (not shown).

Each of the transfer devices 14, 24 and 34 has two mutually parallel conveyor belts 16 and 18, 28 and 28, and 36 and 38, respectively. The mail pieces are conveyed to and can be transported between the respective two conveyor belts in directions indicated by the arrows 15, 25 and 35, respectively, for transfer to a selection unit 80. The conveyor belts 16 and 18, 28 and 28, and 36 and 38, respectively, of the individual transfer devices 14, 24 and 34 are moveable relative to each other perpendicularly to the respective transport direction indicated by the arrows 15, 25 and 35, respectively, against a biasing force. In this way, mail pieces with different thickness can be accepted and transported between the respective conveyor belts.

The selection unit 80 has a substantially circular revolving stage 82 which is capable of rotating in the directions indicated by the double-headed arrow 81 about a stationary axis perpendicular to the direction of rotation. A conveyor unit formed of two mutually parallel continuous loop conveyor belts 84 and 86 is disposed on and rotates with the revolving stage 82. The mail pieces which are to be transferred from the transfer devices 14, 24 and 34, are received by the conveyor belts 84 and 86 and transported to a removal unit 90 for removal. The conveyor belts 84 and 86 are also moveable in a direction perpendicular to the transport direction against the effect of a biasing force so that mail pieces of different thickness can be held between the conveyor belts 84 and 86. Reference is made to EP 0 613 730 A2 with respect to the construction of the revolving stage and the conveyor belt disposed thereon. The transfer devices 14, 24 and 34 are arranged along a circle concentrically with the revolving stage 82; the transport paths of the mail pieces which are removed from the mail piece stacks 10, 20 and 30 and transported between these stacks, extend radially in relation to the stationary axis of rotation extending through the center of the revolving stage 82. Consequently, sufficient space exists in the region of the feed units 12, 22 and 32 at the respective ends of the transfer devices 14, 24 and 34 facing away from the revolving stage 82 for accommodating the mail piece stacks 10, 20 and 30. The space directly surrounding the revolving stage 82, on the other hand, is essentially completely taken up by the transfer devices 14, 24 and 34. As a result, the apparatus of the invention can be built in a rather compact form.

During the operation of the apparatus of the invention, the mail pieces 5 are successively removed from the respective mail piece stack 10, 20 and 30 with the help of the respective feed unit 12, 22 and 32, respectively, and conveyed to the respective transfer device 14, 24 and 34, respectively. At the same time, the mailing address of the mail pieces is scanned with the respective reading device 13, 23 and 33, respectively.

Based on the address information received, the controller checks which particular mail piece of the mail pieces which were conveyed to the transfer devices 14, 24 and 34 and which are available in the transfer devices 14, 24 and 34 for transfer to the selection unit, is in the first position according to the predetermined order. Subsequently, the revolving stage 82 is operated by the controller so that the conveyor belts 84 and 86 are aligned with the conveyor belts which carry the particular mail piece identified above. Consequently, the revolving stage 82 is rotated from the direction depicted in FIG. 1 counterclockwise by 45° about the stationary axis if of all available mail pieces, the particular mail piece between the conveyor belts 16 and 18 of the transfer device 14 is in first position according to the predetermined order. The revolving stage remains in the transfer position illustrated in FIG. 1 if the mail piece between the conveyor belts 26 and 28 of the transfer device 24 is to be transferred next; and that the revolving stage is rotated clockwise by 45° about the stationary axis if the mail piece between the conveyor belts 36 and 38 of the transfer device 34 is identified by the controller as the particular mail piece to be transferred next.

After reaching the transfer position, the conveyor belts of the respective transfer device and the conveyor belts 84 and 86 of the selection unit are actuated for transporting the selected mail piece and receiving the same between the conveyor belts 84 and 86. Thereafter, the revolving stage is rotated into the discharge position depicted in FIG. 1, so that the mail piece held between the conveyor belts 84 and 86 can be transferred to the discharge conveyor 90 for removal. To this effect, the conveyor belts 84 and 86 and the mutually parallel conveyor belts 92 and 94 of the discharge conveyor which transports the mail piece received from the selection unit, are operated in the direction indicated by the arrow 91.

After a mail piece has been received by the selection unit 80, the feed unit associated with the transfer device from which the mail piece was received, is actuated for feeding the next mail piece of the respective mail piece stack to the associated transfer device, so that the aforedescribed process can be repeated iand the sorting process continues, after the mail piece received by the selection unit has been discharged. In this way, the sorted goods of the mail piece stacks in which the mail pieces are already ordered in accordance with the predetermined order, can be transposed into a single ordered sequence according to the predetermined order.

The conveyor belt 94 of the discharge conveyor 90 is made shorter than the conveyor belt 92 so as to enable discharge of the mail pieces which are conveyed to the discharge conveyor 90 in the direction indicated by the arrow 91, in a direction perpendicular to that direction. As can be seen from FIG. 1, the transport path between the conveyor belts 92 and 94 extends radially in relation to the axis of rotation which extends through the center of the revolving stage 82.

The controller used for operating the apparatus depicted in FIG. 1 is designed so that based on the mailing addresses read with the reading devices 13, 23 and 33, the proper order of the mail pieces in the individual mail piece stacks 10, 20 and 30 can also be monitored before the mail pieces are actually transferred to the selection device 80. The controller herein stores the mailing address of the respective mail piece which was received by the selection unit 80 before a new mail piece is supplied to the respective transfer device, and compares the position of that mailing address in relation to the predetermined order with the position of the address of the supplied mail piece in relation to that predetermined order.

As can be seen from FIG. 1, not only do the primary surfaces of the conveyor belts forming the feed units 12, 22 and 32 extend along vertical planes, but also the primary surfaces of all the other conveyor belts of the illustrated apparatus. For the operation of the apparatus depicted in FIG. 1, it is sufficient if the conveyor belts 84 and 86 of the selection unit 80 which transports the mail pieces, only extend in one direction. With this simple layout of the conveyor belts 84 and 86, all mail pieces of the stacks 10, 20 and 30 whose mailing addresses when read with the reading devices 13, 23 and 33, point in the same direction, can be conveyed to the discharge conveyor 90 in such a way that their mailing addresses point in the direction of the conveyor belt 94. Consequently, the addresses can be easily read when the mail pieces are removed from the longer conveyor belt 92.

Figure 2:
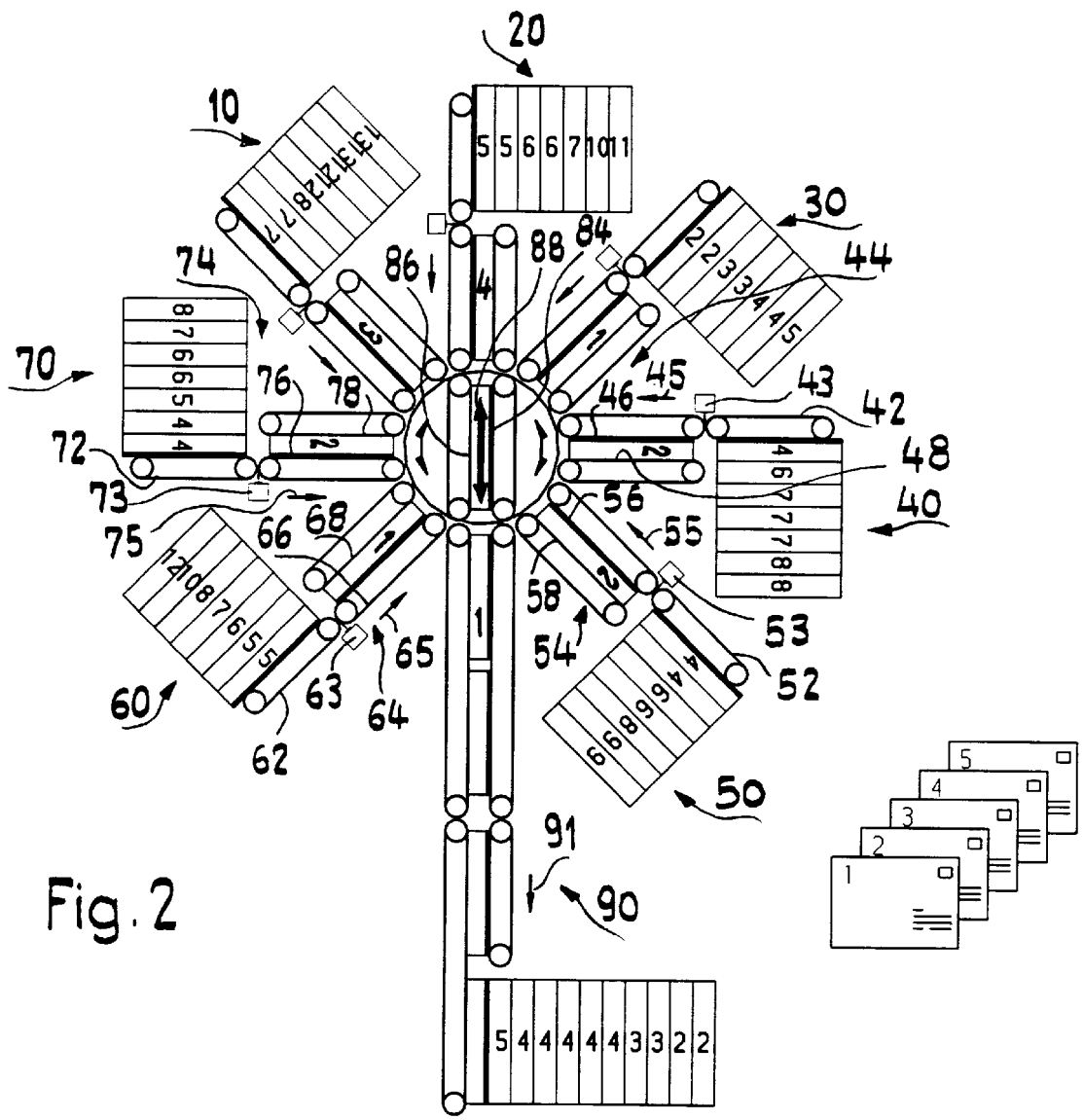
FIG. 2 is a top plan view of an apparatus in accordance with a second embodiment of the invention.

The apparatus depicted in FIG. 2 includes the same components as the apparatus depicted in FIG. 1. For sake of clarity, however, these components are not labeled in FIG. 2 with reference numerals. Moreover, the apparatus of FIG. 2 includes additional feed units 42, 52, 62 and 72, reading devices 43, 53, 63 and 73 as well as transfer devices 44, 54, 64 and 74, each having two mutually parallel conveyor belts 46 and 48, 56 and 58, 66 and 68, and 76 and 78, respectively, for transposing a total of seven mail piece stacks 10, 20, 30, 40, 50, 60 and 70, in which the mail pieces are ordered in accordance with a predetermined order, into a single sequence ordered in accordance with that predetermined order. The apparatus depicted in FIG. 2 operates essentially in the same manner as the apparatus depicted in FIG. 1. The conveyor belts 84 and 86 of the selection unit 80 of this apparatus, however, are arranged in such a way that the mail pieces held therebetween are transported in two opposing directions as indicated by the double-headed arrow 88. This arrangement significantly reduces the angle by which the revolving stage 82 has to rotate in order to receive and convey the mail pieces.

The invention is not restricted to the embodiments described with reference to the drawing. An apparatus according to the invention may also be contemplated for transposing mail pieces supplied in form of only two partial sequences. Moreover, the transfer devices can also be arranged so that they are oriented parallel with respect to each other, if the selection unit for receiving and conveying mail pieces is moveable along a substantially straight path. Finally, transfer grippers instead of the conveyor belts can also be employed for transporting the mail pieces.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. An apparatus which transposes address-bearing sorted goods into an ordered sequence according to a predetermined order of possible addresses, starting with at least two partial sequences in which the sorted goods are ordered according to the predetermined order, the apparatus comprising
    a plurality of actuable transfer devices corresponding to the plurality of partial sequences which sequentially transfers the sorted goods (5) of a respective one of the partial sequences to a selection unit, wherein the selection unit is actuable for selectively accepting sorted goods from all transfer devices and for conveying the received sorted goods to a delivery point common to all sorted goods, and
    a controller for recording the addresses of the sorted goods to be transferred and which actuates the selection unit for receiving and delivering the sorted goods of all partial sequences according to the predetermined order.

2. The apparatus according to claim 1, wherein the selection unit is moveable between transfer positions in which the selection unit is positioned to receive sorted goods from a respective one of the one of the transfer devices and wherein the selection unit is actuable for accepting sorted goods from a respective one of the transfer devices, and a delivery position at the common delivery point for delivering the received sorted goods.

3. The apparatus according to claim 2, wherein the selection unit is also including a delivery position in which the selection unit is positioned to deliver sorted goods to the common delivery point, said delivery position of the selection unit being identical to one of the transfer positions of the selection unit.

4. The apparatus according to claim 3, wherein the selection unit is rotatable about a stationary axis.

5. The apparatus according to claim 4, wherein the plurality of transfer devices are arranged along a circle about the stationary axis.

6. The apparatus according to claim 5, wherein the selection unit comprises an actuable conveyor unit for transporting the sorted goods from the transfer devices to the delivery point.

7. The apparatus according to claim 6, wherein at least one of the plurality of transfer devices comprises an actuable conveyor unit for sequentially transferring the sorted goods to the selection unit.

8. The apparatus according to claim 7, wherein at the delivery point there is disposed an actuable discharge conveyor for removing the delivered sorted goods.

9. The apparatus according to claim 8, wherein at least one of the conveyor units comprises two mutually parallel conveyor belts for transporting the sorted goods between the conveyor belts.

10. The apparatus according to claim 9, wherein at least one of the conveyor belts of at least one of the conveyor units is moveable perpendicular to the conveying direction of the conveyor belt against a biasing force.

11. The apparatus according to claim 10, wherein the primary surfaces of the conveyor belts are arranged in vertical planes.

12. The apparatus according to claim 11, wherein with at least one of the transfer devices there is associated a feed unit for sequentially removing the sorted goods of a partial sequence provided in form of a stack of sorted goods from said stack of sorted goods and feeding the sorted goods to the transfer device.

13. The apparatus according to claim 12, wherein with at least one of the transfer devices there is associated a reading device for automatically reading the addresses of the sorted goods to be conveyed by the transfer devices.

14. The apparatus according to claim 13, wherein the reading device is disposed between the feed unit and the transfer device.

15. The apparatus according to claim 14, wherein the controller for comparing the order of the addresses read by the reading device associated with one of the transfer devices can be operated in the predetermined order.

16. The apparatus according to claim 15, wherein the selection unit for conveying the received sorted goods of all partial sequences can be operated with addresses pointing in the same direction.

17. A method for transposing address-bearing sorted goods into an ordered sequence according to a predetermined order of possible addresses, starting with at least two partial sequences in which the sorted goods are ordered according to the predetermined order, comprising the steps of
    conveying the sorted goods by a number of transfer devices which corresponds to the number of partial sequences, to an actuable selection unit capable of accepting the sorted goods from all partial sequences and conveying the received sorted goods to a common delivery point,
    controlling the selection unit, dependent on the addresses of the sorted goods to be transferred, for receiving and delivering the sorted goods of all partial sequences according to the predetermined order; wherein the selection unit is only controlled to accept an item of the sorted goods item when such item of the sorted goods is available for transfer to the selection unit in each of the transfer devices conveying sorted goods; and wherein the order of the addresses of the sorted goods to be transferred by one of the transfer devices is compared with the predetermined order, before the sorted goods are conveyed to the selection unit.

18. Use of an apparatus for transposing mail pieces provided with mailing addresses into an ordered sequence according to a predetermined order of possible mailing addresses, starting with at least two partial sequences in which sorted goods are ordered according to the predetermined order, the apparatus comprising a plurality of actuable transfer devices corresponding to the plurality of partial sequences for sequentially transferring the sorted goods of a respective one of the partial sequences to a selection unit, wherein the selection unit is actuable for selectively accepting sorted goods from all transfer devices and for conveying the received sorted goods to a delivery point common to all sorted goods, and a controller for recording the addresses of the sorted goods to be transferred and for actuating the selection unit for receiving and delivering the sorted goods of all partial sequences according to the predetermined order; and wherein the order of the addresses of the sorted goods to be transferred by one of the transfer devices is compared with the predetermined order, before the sorted goods are conveyed to the selection unit.

* * * * *